United States Patent
Schindler et al.

(10) Patent No.: US 7,332,541 B2
(45) Date of Patent: Feb. 19, 2008

(54) POLYMER COMPOSITIONS BASED ON ALKOXYSILANE-TERMINATED POLYMERS WITH ADJUSTABLE CURE RATE

(75) Inventors: Wolfram Schindler, Tüssling (DE); Volker Stanjek, München (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 10/524,473

(22) PCT Filed: Aug. 7, 2003

(86) PCT No.: PCT/EP03/08782

§ 371 (c)(1),
(2), (4) Date: Oct. 28, 2005

(87) PCT Pub. No.: WO2004/022618

PCT Pub. Date: Mar. 18, 2004

(65) Prior Publication Data

US 2006/0111505 A1    May 25, 2006

(30) Foreign Application Priority Data

Aug. 14, 2002  (DE) .............................. 102 37 271

(51) Int. Cl.
*C08G 77/04*     (2006.01)
*C08J 3/00*      (2006.01)
*C08K 3/20*      (2006.01)
*C08L 75/00*     (2006.01)
*C08L 83/00*     (2006.01)

(52) U.S. Cl. .................. 524/588; 524/589; 524/590; 528/21; 528/22; 528/25; 528/28

(58) Field of Classification Search ............... 524/588, 524/589, 590; 528/21, 22, 25, 28
See application file for complete search history.

(56) References Cited

U.S. PATENT DOCUMENTS 3,676,478 A * 7/1972 Golitz et al. ................. 556/420
5,118,290 A * 6/1992 Muller et al. ................. 433/48

* cited by examiner

*Primary Examiner*—Patrick Niland
(74) *Attorney, Agent, or Firm*—Brooks Kushman P.C.

(57) ABSTRACT

Condensation curable systems employ ordinarily highly reactive polymers bearing methylene-linked alkoxysilyl groups. By limiting the amounts of activating compounds during the preparation of such polymers, the reactivity is sharply decreased, yet can be increased by addition of suitable catalysts. As a result, the polymers may be easily processed, yet the moisture curing times may be adjusted readily.

8 Claims, No Drawings

POLYMER COMPOSITIONS BASED ON ALKOXYSILANE-TERMINATED POLYMERS WITH ADJUSTABLE CURE RATE

CROSS-REFERENCE TO RELATED APPLICATIONS

This application claims the benefit of German Application No. 10237271.3, filed Aug. 14, 2002, and PCT Application No. PCT/EP03/08782, filed Aug. 7, 2003.

BACKGROUND OF THE INVENTION

1. Field of the Invention

The invention relates to polymer compositions which comprise alkoxysilane-terminated polymers, exhibit long skin formation times, and can be activated by adding a catalyst.

2. Description of the Related Art

Polymer systems which possess reactive alkoxysilyl groups have been known for a long time. In the presence of atmospheric humidity these alkoxysilane-terminated polymers are able even at room temperature to condense with one another, in the course of which alkoxy groups are eliminated. Depending on the amount of alkoxysilane groups and their construction this condensation is accompanied by the formation primarily of long-chain polymers (thermoplastics), relatively wide-mesh, three-dimensional networks (elastomers) or else highly crosslinked systems (thermosets).

The polymers in question may be alkoxysilane-terminated polymers with an organic backbone, such as polyurethanes, polyesters, polyethers, etc., for example, described inter alia in EP-A-269 819, EP-A-931 800, WO 00/37533, U.S. Pat. No. 3,971,751 and DE-A-198 49 817, or copolymers whose backbone, as well as organic constituents, includes organosiloxanes as well, described inter alia in WO 96/34030.

In accordance with the countless possibilities for designing silane-terminated polymer systems of this kind it is possible to tailor almost arbitrarily the properties of the uncrosslinked polymers and/or of the polymer-containing mixtures (viscosity, melting point, solubilities, etc) and also the properties of the crosslinked compositions (hardness, elasticity, tensile strength, breaking elongation, heat resistance, etc.). A corresponding diversity is therefore also exhibited by the possible uses of such silane-terminated polymer systems. Thus they may be employed, for example, for producing elastomers, sealants, adhesives, elastic adhesive systems, rigid and flexible foams, a wide variety of coating systems, and in the medical sector, such as for impression compounds in the dental sector, for example. These products can be applied in any form, such as by spreading, spraying, pouring, compression molding, etc.

A disadvantage of the majority of alkoxysilane-terminated polymer systems described, however, is their moderate reactivity toward moisture, both in the form of atmospheric humidity and in the form of water—added or already present. In order to obtain a sufficient cure rate even at room temperature, therefore, it is vital to add a catalyst. This is particularly problematic because the organotin compounds generally employed as catalysts are toxicologically objectionable. Moreover, the tin catalysts often still contain traces of highly toxic tributyltin derivatives.

A particular problem is the low reactivity of the alkoxysilane-terminated polymer systems when the desire is for systems which even at room temperature possess a high cure rate—for example, skin formation times <15 minutes. With the usual alkoxysilane-terminated polymers, systems having such reactivity can be obtained, if at all, only with very high concentrations of tin catalysts. This generally results in tin levels of more than 1000 ppm.

The skin formation time here is the period of time which elapses between the application of the polymer blend and the formation of a skin. The skin formation is deemed to have come to an end as soon as the mixture, contacted with a laboratory spatula, for example, no longer remains hanging on the spatula and no longer forms a string when the spatula is removed.

A further decisive disadvantage of the relatively low reactivity of the conventional alkoxysilane-terminated polymer systems lies in the fact that for the majority of applications only methoxysilyl-terminated and not ethoxysilyl-terminated polymers can be used. The ethoxysilyl-terminated polymers specifically would be particularly advantageous, since their curing is accompanied by the release not of methanol but only of ethanol as an elimination product. The ethoxysilyl-terminated polymers, however, possess a reactivity which is further markedly reduced, with the consequence that, using them, it is no longer possible to achieve adequate skin formation rates or cure-through-volume rates at room temperature for the majority of applications.

Distinctly more favorable here are polymer blends which comprise alkoxysilane-terminated polymers having the end group (1) of the general formula

where

A is a divalent linking group selected from —O—CO—N(R$^3$)—, —N(R$^3$)—CO—O—, —N(R$^3$)—CO—NH—, —NH—CO—N(R$^3$)— and —N(R$^3$)—CO—N(R$^3$), R$^1$ is an unsubstituted or halogen-substituted alkyl, cycloalkyl, alkenyl or aryl radical having 1-10 carbon atoms, R$^2$ is an alkyl radical having 1-6 carbon atoms or an oxaalkyl-alkyl radical having in total 2-10 carbon atoms, R$^3$ is hydrogen, an unsubstituted or halogen-substituted cyclic, linear or branched $C_1$ to $C_{18}$ alkyl or alkenyl radical or a $C_6$ to $C_{18}$ aryl radical, and a is an integer from 0 to 2.

Silane-terminated polymers of this kind, whose silane termination is separated only by a methylene unit from an adjacent heteroatom, are distinguished by extremely high reactivity toward atmospheric humidity. Thus with methylene-spacered prepolymers of this kind it is possible to prepare blends whose skin formation times even in the absence of any tin catalysts lie in the order of magnitude of just a few minutes. These polymers can include both methoxysilane-terminated polymers and the particularly advantageous ethoxy-silane-terminated polymers.

Compounds corresponding to the general formula (1) have been already described in part, e.g., in DE-A-18 12 562 or DE-A-18 12 564. A disadvantage associated with these polymers, however, is the fact that they were prepared using exclusively aminoalkylsilanes of the general formula (2)

which possess as radicals R$^3$ either hydrogen or else aliphatic groups with little steric bulk, such as cyclohexyl radicals or n-butyl radicals. R$^1$, R$^2$ and a here have the abovementioned definitions.

These compounds are reacted with isocyanate-terminated or else with chloroformic acid-terminated polymers to give the corresponding alkoxysilane-terminated prepolymers.

Although highly reactive isocyanate-free polymer mixtures can be prepared in this way, and can be prepared both from methoxysilyl-terminated polymers and from ethoxysilyl-terminated polymers, these high reactivities neither are controllable nor can be tailored to the particular application.

For instance, in the case of preparation processes corresponding to DE-A-18 12 562 or DE-A-18 12 564, polymers are obtained which, with skin formation times of <<5 minutes possess reactivities which are much too high for many applications and also cannot be reduced or controlled. These polymers are virtually impossible to handle and possess only a low stability on storage. Moreover, such reactive polymers cannot generally be used in customary compounding systems, especially not in filled compositions, since the highly reactive polymers react immediately with the residual moisture present in almost every filler and/or with reactive OH groups on the surface of the filler in question. This generally results in the caking of the composition. Even customary water scavengers, such as vinyltrimethoxysilane, for example, do not allow any improvements to be obtained in this case. Thus the polymer is much more reactive than the conventional water scavenger, and so the latter is unable to fulfill its function of scavenging traces of water prior to a reaction with the silane-terminated polymer.

A further disadvantage is that the addition of a curing catalyst, such as even a common tin catalyst such as dibutyltin dilaurate, for example, cannot be used to adjust the reactivity, since the reactivity of the polymers, which is already extremely high in any case, is virtually impossible to increase. This makes it impossible to use these polymer blends to produce compositions which can be activated only when needed, by addition of a catalyst.

DE-A-21 55 258 and DE-A-21 55 259 propose additionally adding alcohols and acid anhydrides to the polymer blend in order to raise its stability on storage. A disadvantage of this process is, on the one hand, the drastic increase in the amounts of volatile organic compounds, which must evaporate when the alkoxysilane-terminated polymers are cured. For instance, it is necessary to add up to 400% by weight of a solution of alcohols and other organic solvents to the polymers described in DE-A-21 55 258 and DE-A-21 55 259. On the other hand the addition of acid anhydrides leads to acidic compositions, which may attack numerous substrates. As a result, the surface of the substrate is permanently damaged, leading to a substantial loss of adhesion of the respective composition on said surface.

Moreover, these measures only allow a notable improvement to be obtained in the storage stability of the resulting compositions. Thus the systems described in DE-A-21 55 258 and DE-A-21 55 259 continue to possess skin formation times of 1-15 minutes at 25° C. and above 60% atmospheric humidity. Compositions which are slow to react and are stable in air, at least in the short term, and which are activated only by the addition of a suitable catalyst, cannot be obtained by this process.

SUMMARY OF THE INVENTION

It was an object of the present invention, therefore, to develop alkoxysilane-terminated polymer blends which at room temperature are storage-stable and can be handled without problems and yet when required can be activated at any time by the addition of a suitable catalyst to form highly reactive compositions.

DETAILED DESCRIPTION OF THE PREFERRED EMBODIMENTS

The invention provides polymer compositions (M) which comprise alkoxysilane-terminated polymers (P) having end groups of the general formula (1)

-A-CH$_2$—SiR$^1_a$(OR$^2$)$_{3-a}$ (1)

in which A, R$^1$, R$^2$ and a are as defined above, where
a) the polymer compositions (M) exhibit skin formation times >40 minutes at 23° C. and 50% relative atmospheric humidity, and
b) the skin formation times of these polymer compositions (M) can be reduced to <20 minutes by the addition of a catalyst (K) at concentrations of up to 3% by weight.

The invention is based on the surprising discovery that polymer blends which comprise alkoxysilane-terminated polymers (P) with end groups of the general formula (1) are only highly reactive when at the same time they comprise sterically unhindered bases or acids or aromatic amine hydrochlorides. Even traces of these bases or acids, however, are sufficient to activate the alkoxysilane-terminated polymers (P). Since such traces of bases or of acid are present in all polymers prepared by prior art processes, the slow-to-react polymer compositions (M) comprising polymer (P) were completely unknown before now. Thus the polymer blends prepared in accordance with the processes of DE-A-18 12 562, DE-A-18 12 564, DE-A-21 55 258 or DE-A-21 55 259 always still contain traces of unreacted aminosilanes of the general formula (2). Since the aminosilanes used are only silanes of the general formula (2) in which R$^3$ is an aliphatic radical of low steric bulk, these silanes act automatically as basic catalysts and hence result in compositions whose cure rate can no longer be controlled.

The polymer compositions (M) can if desired contain no more than 100 ppm, preferably no more than 50 ppm, of activating compounds (AV), which are selected from sterically unhindered bases, sterically unhindered acids, and aromatic amine hydrochlorides, based on the total mass of the polymer compositions (M). Preferably the polymer compositions (M) are free from activating compounds (AV).

By activating acids and bases (AV) are meant all compounds having a pK$_a$ or pK$_b$, respectively, of <7, preferably <5, which are capable of giving or taking a hydrogen cation to or from a reaction partner, respectively. Examples of sterically unhindered bases are all primary and secondary amines.

Preferred polymer compositions (M) are those which have skin formation times >1 h at 23° C. and 50% relative atmospheric humidity. Particularly preferred polymer compositions (M) are those which have skin formation times >2 h at 23° C. and 50% relative atmospheric humidity.

For the activation, i.e., for the reduction of the skin formation times of the polymer compositions (M) it is possible for all acids, bases, organometallic compounds, especially organotin compounds, to serve as catalysts (K). Preference is given here to using organic acids or bases; with particular preference organic amines are employed. The concentration of the catalysts employed is preferably <2%, more preferably <1%, based in each case on the polymer compositions (M).

Preferred radicals $R^1$ are methyl, ethyl or phenyl groups. The radicals $R^2$ are preferably methyl or ethyl groups, and preferred radicals $R^3$ are hydrogen, alkyl radicals having 1-4 carbon atoms, cyclohexyl radicals and phenyl radicals.

The main chains of the alkoxysilane-terminated polymers (P) may be branched or unbranched. The average chain lengths may be adapted arbitrarily in accordance with the particular desired properties both of the uncrosslinked mixture and of the cured composition. They may be constructed from different units. Normally they are polysiloxanes, polysiloxane-urea/urethane copolymers, polyurethanes, polyureas, polyethers, polyesters, polyacrylates, polymethacrylates, polycarbonates, polystyrenes, polyamides, polyvinyl esters or polyolefins such as polyethylene, polybutadiene, ethylene-olefin copolymers or styrene-butadiene copolymers, for example. It will be appreciated that any desired mixtures or combinations of polymers (P) having different main chains can also be used.

The polymers (P) are preferably prepared by a process which reliably rules out the presence of activating compounds (AV) in the finished polymer composition (M).

For preparing the polymer compositions (M) it is preferred to use an aminosilane (A1) of the general formula (2) in which $R^3$ is a $C_6$ to $C_{18}$ aryl radical. With particular preference the aminosilane (A1) is a silane of the general formula (3)

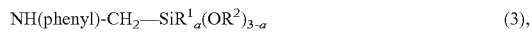

$$NH(phenyl)\text{-}CH_2\text{---}SiR^1_a(OR^2)_{3-a} \quad (3),$$

where $R^1$, $R^2$ and a possess the definitions indicated above.

This aminosilane is preferably reacted with an NCO-terminated prepolymer (A2), the molar amount of the silane (A1) used corresponding largely to the number of NCO units in the prepolymer (A2), so that NCO-free polymers are obtained.

As aromatic amines the silanes (A1) generally possess $pk_b$ values >9, but in any case $pK_B$ values >7, and therefore are no longer sufficiently basic to catalyze the silane condensation. In contradistinction to the aliphatic aminosilanes, traces of the aromatic silane (A1) that remain in the polymer (P) therefore do not result in activation of the finished, sufficiently slow-to-react polymer blends (M).

If the isocyanate-terminated prepolymer (A2) is constructed from one or more polyols (A21) and also di- and/or polyisocyanates (A22), then it is not absolutely necessary for the prepolymer (A2) to be prepared from these units (A21, A22) first of all, and subsequently reacted with the silane (A1) to give the finished polymer (P). Here as well, therefore, it is possible to reverse the reaction steps, by first reacting the di- and/or polyisocyanates (A22) with the silane (A1) and only then reacting the resultant compounds with the polyol component (A21) to give the finished polymer (P).

It has additionally been found that when aromatic aminosilanes (A1) are used their contamination via hydrochlorides of aromatic amines is a problem. These may be either the hydrochlorides of the silanes (A1) themselves or else hydrochlorides of those aromatic amines which were used as reactants in the synthesis of the silanes (A1). This applies in particular to silanes (A1) of the general formula (3), which can be prepared, for example, from aniline and chlorosilanes of the general formula (4)

$$Cl\text{---}CH_2\text{---}SiR^1_a(OR^2)_{3-a} \quad (4)$$

where $R^1$, $R^2$ and a possess the definitions indicated above.

The anilinium hydrochloride formed as a byproduct in this reaction is difficult to separate from the product by distillation, owing to its very low boiling point of only 245° C. and hence appears almost always—at orders of magnitude of at least 20-100 ppm—as a contaminant of the silanes of the general formula (3).

Aromatic amine hydrochlorides, owing to their high acid strength as compared with nonaromatic amines, are very good catalysts for the silane condensation. Accordingly, even minute traces of such hydrochlorides in the polymer compositions (M) lead immediately to compositions which have an extremely high reactivity that can no longer be controlled.

Particular preference is therefore given to an embodiment of the invention wherein an aromatic amine hydrochloride, in particular a hydrochloride of amino-alkylsilanes of the general formula (2), is present in which $R^3$ is a $C_6$ to $C_{18}$ aryl radical and additionally there is a sterically hindered aliphatic amine present, preferably at concentrations of 0.001%-3% by weight, based on the polymer composition (M), which neutralizes the aromatic amine hydrochloride.

This embodiment is significant when the alkoxysilane-terminated polymers (P) are prepared using aminosilanes of the general formula (2) in which $R^3$ is a $C_6$ to $C_{18}$ aryl radical, with the further addition, during or after the polymer synthesis, of a sterically hindered aliphatic amine, at concentrations of 0.001%-3% by weight. The sterically hindered aliphatic amine is preferably a tertiary aliphatic amine, more preferably an N-alkylated morpholine derivative. This amine serves for the neutralization, i.e., deactivation, of the catalytically active, acidic, aromatic amine hydrochloride with which the aromatic aminosilane used was contaminated. Owing to the steric shielding of the basic nitrogen atom, the sterically hindered amine added cannot itself act as a catalyst here. Where a morpholine derivative with a tertiary nitrogen atom is added, the morpholine derivative is prevented from itself acting as catalyst not only by the steric hindrance on the nitrogen atom but also by the low base strength as compared with conventional aliphatic amines. A polymer composition (M) comprising silane-terminated polymers (P) is obtained whose skin formation time at 23° C. and 50% relative atmospheric humidity is >40 minutes.

A particularly preferred example of a suitable sterically hindered amine is 2,2'-dimorpholinodiethyl ether.

In a further particularly preferred embodiment of the invention the alkoxysilane-terminated polymers (P) are prepared, using aminosilanes of the general formula (2) in which $R^3$ is a $C_6$ to $C_{18}$ aryl radical, in such a way that the aminosilanes used possess a halogen content, especially chloride content, of <20 ppm, preferably <1 ppm and more preferably <0.1 ppm.

In another preferred embodiment of the invention the polymers (P) in the polymer compositions (M) are prepared using an isocyanatosilane (B1) of the general formula (5)

$$OCN\text{---}CH_2\text{---}SiR^1_a(OR^2)_{3-a} \quad (5)$$

in which $R^1$, $R^2$ and a possess the definitions indicated above.

The isocyanatosilane (B1) is reacted with an OH— or NH-terminated prepolymer (B2). The molar amount of the silane (B1) used is less than or equal to the molar number of the OH/NH groups, so that NCO-free polymers are obtained.

If the OH-terminated prepolymer (B2) is constructed from one or more polyols (B21) and also di- and/or polyisocyanates (B22), it is not absolutely necessary for the prepolymer (B2) to be prepared first from these units (B21, B22) before being reacted with the silane (B1) to give the finished polymer (P). Thus, here again, it is possible to reverse the reaction steps, by first reacting polyols (B21) with the isocyanatosilane (B1) and only then reacting the resultant compounds with the di- or polyisocyanate (B22) to give the finished polymer (P).

In the case of this preferred execution of the invention no basic compounds at all are used in the preparation of the polymers (P). The resulting compositions are therefore slow to react and are only activated by the addition of a catalyst (K).

In one particularly preferred process the polymers (P) are prepared from isocyanatosilanes (B1) and OH prepolymers (B2) in the presence of very small concentrations of a tin catalyst, preferably an organotin compound. Examples of tin catalysts are dibutyltin dilaurate, dioctyltin dilaurate, dibutyltin diacetylacetonate, dibutyltin diacetate or dibutyltin dioctanoate. Preference is given here to using dibutyltin dilaurate. The concentrations of the tin catalysts used are preferably chosen such that the tin content of the resulting composition is <200 ppm, preferably <100 ppm and more preferably <50 ppm.

The use of a tin catalyst in the synthesis of the polymers (P) is based on the surprising discovery that tin catalysts catalyze the curing reaction of the polymers (P) either very poorly or not at all. This finding is striking in particular for the reason that, in the case of conventional silane-terminated polymers whose silane terminations do not conform to the general formula (1), tin compounds represent particularly highly performing catalysts. The polymers (P), in contrast, are still sufficiently slow to react in the presence of the tin catalyst at the concentrations indicated, and are activated only by the addition of a suitable basic catalyst (K).

Preferred units (A21, A22, B21, B22, C21, C22) for the preparation of the polymers (P), besides the silanes (A1, B1, C1) are OH-terminated polyols, monomeric alcohols/amines having at least 2 OH/NH functions, and/or hydroxyalkyl- or aminoalkyl-terminated poly-diorganosiloxanes, and also di- or polyisocyanates.

In the preparation of the polymer (P) the concentrations of all isocyanate groups involved in all reaction steps, and of all isocyanate-reactive groups, and also the reaction conditions, are preferably chosen so that all of the isocyanate groups are consumed by reaction in the course of the polymer synthesis. The finished polymer (P) is therefore isocyanate-free.

Particularly suitable polyols for preparing the polymers (P) include aromatic and aliphatic polyester polyols and polyether polyols, such as have been described in numerous instances in the literature. In principle, however, it is possible to use any polymeric, oligomeric or even monomeric alcohols having two or more OH functions.

As hydroxyalkyl- or aminoalkyl-terminated polysiloxanes it is preferred to use compounds of the general formula (7)

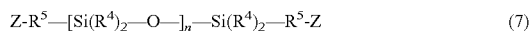

in which $R^4$ is a monovalent hydrocarbon radical having 1 to 12 carbon atoms, preferably methyl radical, $R^5$ is a divalent branched or unbranched hydrocarbon radical having 1-12 carbon atoms, preferably trimethylene radical, n is a number from 1 to 3 000, preferably a number from 10 to 1000, and Z is an OH or SH group or a group $NHR^3$.

Examples of customary diisocyanates are diisocyanato-diphenylmethane (MDI), both in the form of crude or technical MDI and in the form of pure 4,4' and/or 2,4' isomers or mixtures thereof, tolylene diisocyanate (TDI) in the form of its various regioisomers, diisocyanatonaphtha-lene (NDI), isophorone diisocyanate (IPDI) or else hexamethylene diisocyanate (HDI). Examples of polyisocyanates are polymeric MDI (P-MDI), triphenylmethane triisocyanate or biuret triisocyanates.

Preferred catalysts (K) for activating the polymer blends of the invention are organic amino compounds. These can be primary, secondary or else tertiary amines. The extent of the steric shielding on the nitrogen atom allows the catalytic activity of the catalyst (K) to be controlled. When using sterically unhindered amines, such as primary amines, for example, it is possible to prepare polymer compositions (M), comprising the polymer (P), which possess skin formation times <15 minutes, preferably <5 minutes.

In the case of compounding operations, the catalyst (K) is preferably added as late as possible. In this way problems both with inadequate storage stabilities and with significantly impaired handling properties of the polymer composition (M) are avoided. Following activation by the addition of the catalyst (K), the finished compound can be dispensed directly into cartridges, cans, tubes, etc. These containers are generally gastight, and so in that case a high reactivity toward atmospheric moisture no longer leads to any problems.

Virtually all aliphatic amines can be used as catalysts (K). Examples of catalytically active amines are triethylamine, tributylamine, 1,4-diazabicyclo[2.2.2]-octane, N,N-bis(N,N-dimethyl-2-aminoethyl)methylamine, N,N-dimethylcyclohexylamine, N,N-dimethylphenylamine, 1,5-diazabicyclo[4.3.0]non-5-ene, 1,8-diazabicyclo-[5.4.0]undec-7-ene, etc. These catalysts are preferably used at concentrations of 0.01%-10% by weight. The various catalysts can be used either in pure form or else as mixtures of different catalysts. Through the type and concentration of the catalysts added it is possible to adjust the cure rate in accordance with what is required.

In an embodiment which is further particularly preferred use is made as catalysts (K) of compounds of the general formula (8)

where $R^6$ is a divalent, branched or unbranched hydrocarbon radical having 1-10 carbon atoms, uninterrupted or interrupted by oxygen or groups $N(R^3)$, $R^7$ and $R^8$ are hydrogen or a branched or unbranched alkyl radical having 1-20 carbon atoms, it being also possible for the alkyl radical to be substituted by halogen atoms, hydroxyl groups, amino groups, monoalkylamino groups, dialkylamino groups or alkoxy groups, and $R^1$, $R^2$, $R^3$ and a possess the definitions indicated above.

As further components the polymer compositions (M) may comprise conventional auxiliaries, such as fillers, water scavengers, reactive diluents, adhesion promoters, plasticizers, thixotropic agents, light stabilizers, fungicides, flame retardants, pigments, etc., such as are known for use in all conventional alkoxy-crosslinking one-component and two-component compositions. In order to generate the particularly desired profiles of properties both of the uncrosslinked polymer compositions (M) and of the cured compositions it is generally vital to make such additions.

Numerous different applications exist for the polymer compositions (M) in the area of adhesives, sealants and joint sealers, assembly foams, surface coatings, and also for the production of moldings.

They are suitable for countless different substrates, such as mineral substrates, metals, plastics, glass, ceramic, etc., for example.

The polymer compositions (M) can be employed either in pure form or in the form of solutions, emulsions or dispersions.

All of the above symbols in the above formulae have their definitions in each case independently of one another. In all formulae the silicon atom is tetravalent.

Unless indicated otherwise, all amounts and percentages are by weight, all pressures are 0.10 MPa (abs.) and all temperatures are 20° C.

EXAMPLES

Preparation of isocyanatomethyl-trimethoxysilane

Methylcarbamatomethyl-trimethoxysilane is pumped in a stream of argon into a quartz pyrolysis tube packed with quartz wool. The temperature in the pyrolysis tube is between 420 and 470° C. The crude product is condensed out at the end of the heated section by means of a condenser and collected. The yellowish brown liquid is purified by distillation under reduced pressure. The desired product goes over at the top at about 88-90° C. (82 mbar) in a purity of more than 99%, while the unreacted carbamate in the liquid phase can be reisolated. It is supplied again directly to the pyrolysis.

The further-described isocyanatomethyl-methyldimethoxysilane is prepared in accordance with the analogous process.

Preparation of
N-phenylaminomethyl-trimethoxysilane 537 g (5.77 mol) of aniline are introduced completely as an initial charge to a laboratory reactor and then rendered inert using nitrogen. This initial charge is heated to a temperature of 115° C., 328 g (1.92 mol) of chloromethyl-trimethoxysilane are added dropwise over 1.5 h, and the mixture is subsequently stirred at 125-130° C. for a further 30 minutes. Following the addition of about 150 g of the silane there is increased precipitation of aniline hydrochloride in the form of a salt, but the suspension remains readily stirrable until the end of metering.

Aniline employed in excess (about 180 g) is removed under an effective vacuum (62° C. at 7 mbar). Subsequently 350 ml of toluene are added at about 50° C. and the suspension is stirred for 30 minutes at 10° C. in order for aniline hydrochloride to crystallize. This hydrochloride is subsequently removed by filtration. The toluene solvent is removed in a partial vacuum at 60-70° C. The residue is purified by distillation (89-91° C. at 0.16 mbar).

A yield of 331.2 g, i.e., 75.9% of theory, is obtained, with a product purity of about 96.5%. The product contains about 3.5% of N,N-bis[trimethoxysilylmethyl]-phenylamine as an impurity. The resulting product possesses a chloride content of approximately 100 ppm.

Example 1a 400 g (50.0 mmol) of a polypropylene glycol having an average molecular weight of 8,000 g/mol are introduced as an initial charge, dewatered in vacuo at 100° C. for 1 h and polymerized with 5.5 g (25 mmol) of isophorone diisocyanate at 100° C. over the course of 60 minutes. The OH-terminated polyurethane prepolymer obtained is subsequently cooled to 60° C., admixed with 9.8 g (110 mmol) of isocyanatomethyl-trimethoxysilane and stirred for 60 minutes until the IR spectrum no longer contains an isocyanate band. This gives a clear, transparent polymer having a viscosity of 85 Pas at 20° C.

In a laboratory planetary mixer at about 25° C., the silane-terminated polymer thus prepared is admixed with 95 g of diisoundecyl phthalate, 20.0 g of vinyltrimethoxysilane and 430 g of precipitated, dried chalk (dried beforehand, water content <500 ppm) and processed to a paste of firm consistency. The resulting paste exhibits a skin formation time of more than 1 h (23° C., 50% rh). By addition of a further 20.0 g of 3-(2-aminoethyl)aminopropyltrimethoxysilane as catalyst the skin formation time in air is approximately 5 minutes (23° C., 50% rh).

Example 1b 400 g (50.0 mmol) of a polypropylene glycol having an average molecular weight of 8,000 g/mol are introduced as an initial charge, dewatered in vacuo at 100° C. for 1 h and polymerized with 5.5 g (25 mmol) of isophorone diisocyanate at 100° C. over the course of 60 minutes. The OH-terminated polyurethane prepolymer obtained is subsequently cooled to 60° C., admixed with 8.9 g (55 mmol) of isocyanatomethyl-methyldimethoxysilane and stirred for 60 minutes until the IR spectrum no longer contains an isocyanate band. This gives a clear, transparent polymer having a viscosity of 77 Pas at 20° C.

In a laboratory planetary mixer at about 25° C., the silane-terminated polymer thus prepared is admixed with 95 g of diisoundecyl phthalate, 20.0 g of vinyltrimethoxysilane and 430 g of precipitated, dried chalk (dried beforehand, water content <500 ppm) and processed to a paste of firm consistency. The resulting paste exhibits a skin formation time of more than 3 h (23° C., 50% rh). By addition of a further 20.0 g of 3-(2-aminoethyl)aminopropyltrimethoxysilane as catalyst the skin formation time in air is approximately 15 minutes (23° C., 50% rh).

Example 2

500 g (11.1 mmol) of α, ω-(3-aminopropyl)polydimethylsiloxane having an average molecular weight of 45,000 g/mol are heated to 80° C. in a heatable laboratory planetary mixer with vacuum pump and are baked in vacuo for 0.5 h. Subsequently 3.9 g (22.2 mmol) of isocyanatomethyl-trimethoxysilane are added at 80° C. and the mixture is stirred further for one hour. The complete reaction of the silane is monitored by means of IR spectroscopy with reference to the NCO band.

The silane-terminated polymer obtained is cooled to 25° C. with stirring and admixed with 230.0 g of a trimethylsilyl-terminated polydimethylsiloxane having a viscosity of 100 Pas, 20.0 g of vinyltrimethoxysilane and 85.0 g of a hydrophilic pyrogenic silica and processed within 0.5 h to a paste of firm consistency. The resulting paste exhibits a skin formation time of more than 2 h (23° C., 50% rh). By addition of a further 8.0 g of 3-(2-aminoethyl)aminopropyltrimethoxysilane as catalyst the skin formation time in air is less than 5 minutes (23° C., 50% rh).

Example 3

400 g (50.0 mmol) of a polypropylene glycol having an average molecular weight of 8,000 g/mol are introduced as an initial charge, dewatered at 100° C. in vacuo for 1 h, admixed with 19.5 g (110 mmol) of isocyanatomethyl-trimethoxysilane and stirred for 60 minutes until there is no longer an isocyanate band in the IR spectrum. This gives a clear, transparent polymer having a viscosity of 8.5 Pas.

The silane-terminated polymer thus prepared is admixed in a laboratory planetary mixer at about 25° C. with 13.0 g of vinyltrimethoxysilane and 195 g of precipitated and dried chalk (dried beforehand, water content <500 ppm) and processed to a paste of firm consistency. The paste thus obtained exhibits a skin formation time of more than 2 h (23° C., 50% rh). By addition of a further 13.0 g of 3-(2-aminoethyl)aminopropyltrimethoxysilane as catalyst the skin formation time in air is less than 5 minutes (23° C., 50% rh).

Example 4

A polymer prepared according to example 3 is admixed with 0.5% of a basic compound (see table 1) and the skin formation time at 23° C. and 50% rh is determined.

TABLE 1

| Amine | None | DBU[1] | Cyclohexyl-amine | Dibutyl-amine |
|---|---|---|---|---|
| Skin formation time | >3 h | <1 min | 2 min | 7 min |
| Amine | Diethylamine | Aminosilane[2] | DMAP[3] | Triethyl-amine |
| Skin formation time | 8 min | 5 min | 22 min | 90 min |

[1]DBU: 1,8-Diazabicyclo[5.4.0]undec-7-ene
[2]Aminosilane: 3-(2-aminoethyl)aminopropyl-trimethoxysilane
[3]4-(N,N-Dimethylamino)pyridine Example 5

A 250 ml reaction vessel with stirring, cooling and heating facilities is charged with 30 g (70.6 mmol) of a polypropylene glycol having an average molar mass of 425 g/mol and this initial charge is dewatered by heating at 100° C. for 1 hour under a membrane pump vacuum. It is subsequently cooled to about 50° C. and at that temperature 24.6 g (141.2 mmol) of toluene 2,4-diisocyanate (TDI) are added under nitrogen at a rate such that the temperature does not climb above 80° C. After the end of the addition, the mixture is stirred at 80° C. for 15 minutes.

It is cooled to about 50° C. and 5 ml of vinyltrimethoxysilane are added as a reactive diluent. 0.12 g of 2,2-dimorpholinodiethyl ether (Jeffcat® DMDLS from Huntsman) is added as an acid scavenger. This neutralizes the acidic aniline hydrochloride derivatives present in the N-phenylaminomethyltrimethoxysilane. Thereafter 32.1 g (141.2 mmol) of N-phenylaminomethyl-trimethoxysilane (chloride content about 100 ppm) are added dropwise and the mixture is subsequently stirred at 80° C. for 60 minutes. In the resulting prepolymer mixture it is no longer possible to detect any isocyanate groups by IR spectroscopy. This gives a clear, transparent prepolymer mixture which can be poured without problems at 50° C., with a viscosity of about 15 Pas.

The mixture obtained, with skin formation times of >2 h (23° C., 50% rh) is relatively slow to react. It can be handled, dispensed and/or compounded with further components, all without problems. In addition it is stable on storage in closed vessels for at least 6 months.

This prepolymer mixture can be activated at any desired point in time by adding, for example, 0.5% by weight of aminopropyl-trimethoxysilane or 0.5% by weight of 1,8-diazabicyclo[5.4.0]undec-7-ene. Using these very active catalysts, skin formation times of approximately 1 minute (23° C., 50% rh) are achieved. Moreover, in order to activate the slow-to-react prepolymer mixtures, it is also possible to use amines with a relatively strong steric hindrance, in order to set the particular desired reactivity. Thus, for example, with secondary amines such as cyclohexylaminomethyl-trimethoxysilane (addition of 0.5% by weight), skin formation times of approximately 10 minutes (23° C., 50% rh) can be achieved, while tertiary amines such as diethylaminomethyl-trimethoxysilane (addition of 1% by weight) or bis(2-dimethylaminoethyl) ether (addition of 1% by weight) lead to skin formation times of 20-30 minutes (23° C., 50% rh).

Comparative Example 1

The same procedure is followed as in example 5. However, no 2,2-dimorpholinodiethyl ether is added. Likewise obtained is a clear, transparent prepolymer mixture which has a viscosity of about 18 Pas at 50° C. This prepolymer mixture, however, with a skin formation time of <1 minute (23° C., 50% rh), is extremely reactive. It can be handled, dispensed or compounded with further components only under inert gas. It is stable on storage only in gastight containers. Opening such a container leads immediately to the formation of a skin.

By adding catalysts it is no longer possible recognizably to raise the reactivity of this prepolymer mixture, which is already of high reactivity in any case.

The invention claimed is:

1. A polymer composition comprising at least one alkoxysilane-terminated polymer (P) bearing end group(s) (1) of the general formula

where
A each independently is a divalent linking group selected from the group consisting of —O—CO—N($R^3$)—, —N($R^3$)—CO—O—, —N($R^3$)—CO—NH—, —NH—CO—N($R^3$)— and —N($R^3$)—CO—N($R^3$),
$R^1$ each independently is an unsubstituted or halogen-substituted alkyl, cycloalkyl, alkenyl or aryl radical having 1-10 carbon atoms,
$R^2$ each independently is an alkyl radical having 1-6 carbon atoms or an ω-oxaalkyl-alkyl radical having in total 2-10 carbon atoms,
$R^3$ each independently is hydrogen, an unsubstituted or halogen-substituted cyclic, linear or branched $C_1$ to $C_{18}$ alkyl or alkenyl radical or a $C_6$ to $C_{18}$ aryl radical, and
a is an integer from 0 to 2, where
a) the polymer compositions exhibit skin formation times >40 minutes at 23° C. and 50% relatively atmospheric humidity, and
b) the skin formation times of the polymer compositions can be reduced to <20 minutes by the addition of a catalyst (K) at concentrations of up to 3% by weight
wherein the polymer(s) (P) are obtained by reaction employing an aminosilane (A1) of the formula (2)

where
$R^3$ is a $C_6$ to $C_{18}$ aryl radical,
further containing 0.001%-3% by weight of a sterically hindered aliphatic amine.

2. The polymer composition of claim 1, wherein the sterically hindered aliphatic amine is an N-alkylated morpholine derivative.

3. A polymer composition comprising at least one alkoxysilane-terminated polymer (P) bearing end group(s) (1) of the general formula $$\text{-A-CH}_2\text{—SiR}^1_a(\text{OR}^2)_{3-a} \qquad (1)$$

where
- A each independently is a —O—CO—N($R^3$)—, —N($R^3$)—CO—O—, or —N($R^3$)—CO—N($R^4$)— divalent linking group,
- $R^1$ each independently is an unsubstituted or halogen-substituted alkyl, cycloalkyl, alkenyl or aryl radical having 1-10 carbon atoms,
- $R^2$ each independently is an alkyl radical having 1-6 carbon atoms or an ω-oxaalkyl-alkyl radical having in total 2-10 carbon atoms,
- $R^3$ each independently is hydrogen, an unsubstituted or halogen-substituted cyclic, linear or branched $C_1$ to $C_{18}$ alkyl or alkenyl radical or a $C_6$ to $C_{18}$ aryl radical, and
- $R^4$ each independently is a $C_6$-$C_{18}$ aryl radical,
- a is an integer from 0 to 2, where
  a) the polymer compositions exhibit skin formation times >40 minutes at 23° C. and 50% relatively atmospheric humidity, and
  b) the skin formation times of the polymer compositions can be reduced to <20 minutes by the addition of a catalyst (K) at concentrations of up to 3% by weight wherein the polymers (P) are obtained by reaction employing an isocyanatosilane (B1) of the formula (5)

$$\text{OCN—CH}_2\text{—SiR}^1_a(\text{OR}^2)_{3-a}. \qquad (5)$$

4. A polymer composition comprising at least one alkoxysilane-terminated polymer (P) bearing end group(s) (1) of the general formula $$\text{-A-CH}_2\text{—SiR}^1_a(\text{OR}^2)_{3-a} \qquad (1)$$

where
- A each independently is a —O—CO—N($R^3$)—, or —N($R^3$)—CO—O— divalent linking group,
- $R^1$ each independently is an unsubstituted or halogen-substituted alkyl, cycloalkyl, alkenyl or aryl radical having 1-10 carbon atoms,
- $R^2$ each independently is an alkyl radical having 1-6 carbon atoms or an ω-oxaalkyl-alkyl radical having in total 2-10 carbon atoms,
- $R^3$ each independently is hydrogen, an unsubstituted or halogen-substituted cyclic, linear or branched $C_1$ to $C_{18}$ alkyl or alkenyl radical or a $C_6$ to $C_{18}$ aryl radical, and
- a is an integer from 0 to 2, where
  a) the polymer compositions exhibit skin formation times >40 minutes at 23° C. and 50% relatively atmospheric humidity, and
  b) the skin formation times of the polymer compositions can be reduced to <20 minutes by the addition of a catalyst (K) at concentrations of up to 3% by weight.

5. The polymer composition of claim 4, which contains not more than 100 ppm of activating compounds (AV) selected from the group consisting of sterically unhindered bases, sterically unhindered acids and aromatic amine hydrochlorides, based on the total mass of the polymer compositions.

6. The polymer composition of claim 4, wherein the catalyst(s) (K) are selected from acids, bases and organometallic compounds.

7. The polymer composition of claim 4, wherein the catalysts (K) comprise organic amino compounds.

8. The polymer composition of claim 4, wherein catalyst(s) (K) comprise compounds of the formula (8)

$$R^7R^8N\text{—}R^6\text{—SiR}^1_a(\text{OR}^2)_{3-a} \qquad (8),$$

where
- $R^6$ each independently is a divalent, branched or unbranched hydrocarbon radical having 1-10 carbon atoms, optionally interrupted by non-adjacent oxygen or by groups N($R^3$), and
- $R^7$ and $R^8$ are each independently hydrogen or a branched or unbranched alkyl radical having 1-20 carbon atoms, the alkyl radical optionally substituted by halogen atoms, hydroxyl groups, amino groups, monoalkylamino groups, dialkylamino groups or alkoxy groups.

* * * * *